United States Patent
Rama et al.

(10) Patent No.: US 10,693,155 B2
(45) Date of Patent: Jun. 23, 2020

(54) COOLANT PURIFICATION

(71) Applicant: INTELLIGENT ENERGY LIMITED, Loughborough (GB)

(72) Inventors: Pratap Rama, Loughborough (GB); Mathias Crespy, Loughborough (GB)

(73) Assignee: INTELLIGENT ENERGY LIMITED, Loughborough (GB)

( * ) Notice: Subject to any disclaimer, the term of this patent is extended or adjusted under 35 U.S.C. 154(b) by 0 days.

(21) Appl. No.: 16/262,752

(22) Filed: Jan. 30, 2019

(65) Prior Publication Data

US 2019/0165388 A1 May 30, 2019

Related U.S. Application Data

(63) Continuation of application No. 14/910,362, filed as application No. PCT/GB2014/052411 on Aug. 6, 2014, now Pat. No. 10,218,009.

(30) Foreign Application Priority Data

Aug. 8, 2013 (GB) .................................. 1314217.9

(51) Int. Cl.
*H01M 8/04* (2016.01)
*H01M 8/04044* (2016.01)
(Continued)

(52) U.S. Cl.
CPC ......... *H01M 8/04044* (2013.01); *C02F 1/008* (2013.01); *C02F 1/78* (2013.01); *H01M 8/04029* (2013.01); *H01M 8/04485* (2013.01); *H01M 8/04626* (2013.01); *H01M 8/04768* (2013.01); *C02F 1/32* (2013.01); *C02F 1/42* (2013.01); *C02F 2103/023* (2013.01);
(Continued)

(58) Field of Classification Search
CPC ......... H01M 8/04044; H01M 8/04029; H01M 8/04485; H01M 8/04626; H01M 8/04768; H01M 2250/20
See application file for complete search history.

(56) References Cited

U.S. PATENT DOCUMENTS

| 5,720,869 A | 2/1998 | Yamanaka et al. |
| 2002/0164511 A1 | 11/2002 | Uozumi |

(Continued)

FOREIGN PATENT DOCUMENTS

| CN | 102222793 A | 10/2011 |
| CN | 102414415 A | 4/2012 |

(Continued)

OTHER PUBLICATIONS

Great Britain Patent Application No. 1314217.9; Search Report; dated Feb. 4, 2014; 3 pages.
International Search Report and Written Opinion dated Nov. 7, 2014 in International Application No. PCT/GB2014/052411.

*Primary Examiner* — Jane J Rhee
(74) *Attorney, Agent, or Firm* — BakerHostetler

(57) ABSTRACT

A fuel cell system comprising a fuel cell stack is disclosed. An ozone generator is configured to introduce ozone into a coolant in the fuel cell system. A deionisation apparatus is coupled to the fuel cell stack. A bypass conduit is arranged in parallel with the deionisation apparatus. A controller is configured to control flow of the coolant to the fuel cell stack through either the deionisation apparatus or the bypass conduit based on the operating state of the ozone generator.

20 Claims, 4 Drawing Sheets

(51) Int. Cl.
    *C02F 1/00*     (2006.01)
    *C02F 1/78*     (2006.01)
    *H01M 8/04029*     (2016.01)
    *H01M 8/0444*     (2016.01)
    *H01M 8/04746*     (2016.01)
    *H01M 8/04537*     (2016.01)
    *C02F 1/32*     (2006.01)
    *C02F 1/42*     (2006.01)
    *C02F 103/02*     (2006.01)

(52) U.S. Cl.
    CPC    *C02F 2201/3222* (2013.01); *C02F 2201/782* (2013.01); *C02F 2209/23* (2013.01); *C02F 2209/40* (2013.01); *C02F 2209/44* (2013.01); *C02F 2301/043* (2013.01); *C02F 2303/04* (2013.01); *C02F 2303/18* (2013.01); *H01M 2250/20* (2013.01); *Y02T 90/32* (2013.01)

(56) References Cited

U.S. PATENT DOCUMENTS

| | | |
|---|---|---|
| 2004/0253490 A1 | 12/2004 | Wulff et al. |
| 2007/0248853 A1 | 10/2007 | Ukai et al. |
| 2009/0130529 A1 | 5/2009 | Yamamoto et al. |
| 2009/0317680 A1 | 12/2009 | Imamura et al. |
| 2012/0148930 A1 | 6/2012 | Beylich et al. |

FOREIGN PATENT DOCUMENTS

| | | |
|---|---|---|
| DE | 102008054370 | 6/2010 |
| EP | 1503444 | 2/2005 |
| JP | H08-022833 A | 1/1996 |
| JP | H08-126886 A | 5/1996 |
| JP | H10-337324 A | 12/1998 |
| JP | H11-047754 A | 2/1999 |
| JP | 2003-251362 | 9/2003 |
| JP | 2006-032078 A | 2/2006 |

COOLANT PURIFICATION

CROSS-REFERENCE TO RELATED APPLICATIONS

This application is a Continuation of U.S. patent application Ser. No. 14/910,362 filed Feb. 5, 2016, which is a National Stage of International Patent Application No.PCT/GB2014/052411, filed Aug. 6, 2014, and claims priority to foreign application GB 1314217.9, filed Aug. 8, 2013, the contents of which are incorporated herein by reference in their entirety.

The present invention relates to electrochemical fuel cells disposed in a stack formation, and in particular to cooling systems for such fuel cell stacks. In particular, it relates to a fuel cell system, a coolant assembly for a fuel cell system, and a vehicle including the fuel cell system.

Conventional electrochemical fuel cells convert fuel and oxidant, generally both in the form of gaseous streams, into electrical energy and a reaction product. A common type of electrochemical fuel cell for reacting hydrogen and oxygen comprises a polymeric ion transfer membrane, also known as a proton exchange membrane (PEM), within a membrane-electrode assembly (MEA), with fuel and air being passed over respective sides of the membrane. Protons (i.e., hydrogen ions) are conducted through the membrane, balanced by electrons conducted through a circuit connecting the anode and cathode of the fuel cell. To increase the available voltage, a stack is formed comprising a number of MEAs electrically arranged in series. Each MEA is provided with separate anode and cathode fluid flow paths. The anode and cathode fluid flow paths respectively deliver fuel and oxidant to the membrane. The fuel cell stack is typically in the form of a block comprising numerous individual fuel cell plates held together by end plates at either end of the stack.

Because the reaction of fuel and oxidant generates heat as well as electrical power, a fuel cell stack requires cooling once an operating temperature has been reached, to avoid damage to the fuel cells. Cooling may be achieved at least in part by the delivery of coolant (such as water) to individual cells in the stack in either the anode fluid flow paths (which serves to hydrate the anode) and/or in the cathode fluid flow path which combines with reactant water. In each case, evaporative cooling of the fuel cells can occur.

In a typical arrangement, cooling water is injected into the anode or cathode fluid flow channels of the fuel cell stack. The coolant water must be very pure. If contaminated coolant water is introduced into the fuel cell stack then the contaminants can drastically affect the performance of the fuel cell stack and can degrade the components within the stack. Contaminants may be inorganic (such as metal ions) and organic (such as organic contaminant molecules and bacteria/microbes). It is therefore beneficial to treat water before it enters the fuel cell stack to remove contaminants.

One way of cleaning coolant is to pass it through a deionisation apparatus, which acts to remove unwanted ions from the coolant. Such ions may otherwise detrimentally affect the fuel cell stack by, for example, interacting with the polymer electrolyte. A deionisation apparatus typically contains ion exchange resin (for example as beads) through which the coolant water can pass. Ions in the coolant which are harmful for the fuel cell stack are exchanged for less harmful ions.

Another way of cleaning coolant is to use ozone. Ozone is a powerful disinfectant and may be used to clean contaminated coolant water, by attacking and breaking down bacteria/microbes, and suppressing microbial growth.

Ozone is ideal for water disinfection, but will degrade ion exchange resin if it comes into contact with the resin. Thus the combination of using ozone and a deionisation apparatus to purify coolant water in a fuel cell is not currently possible. Degradation of the resin may lead to reduced efficiency of ion exchange and may require the resin to be replaced more frequently than if no ozone degradation occurs.

According to one aspect, the invention provides a fuel cell system comprising a fuel cell stack, an ozone generator configured to introduce ozone into a coolant in the fuel cell system, a deionisation apparatus coupled to the fuel cell stack, a bypass conduit arranged in parallel with the deionisation apparatus, and a controller. The controller is configured to control flow of the coolant to the fuel cell stack through either the deionisation apparatus or the bypass conduit based on the operating state of the ozone generator.

Advantageously, the bypass provides an alternative route for coolant to reach the fuel cell stack without passing through (and potentially damaging) the deionisation apparatus.

The controller may be configured such that coolant passes through the bypass conduit when a level of ozone in the coolant is determined to be above a predetermined threshold, and such that coolant passes through the deionisation apparatus when the level of ozone in the coolant is determined to be below a predetermined threshold.

The controller may be configured to control the coolant flow to the fuel cell stack such that the coolant passes through the bypass conduit during an ozone generation period, during which the ozone generator introduces ozone into the coolant, and during an ozone decomposition period. Advantageously, coolant can be supplied to a fuel cell stack via the bypass conduit (avoiding the deionisation apparatus) while ozone is being introduced into the coolant and while ozone in the coolant is no longer introduced, but is still present, and decomposing, in the coolant.

The controller may be configured to control the coolant flow to the fuel cell stack such that the coolant passes through the deionisation apparatus outside the ozone generation period and ozone decomposition period. Thus advantageously, when the level of ozone is at a suitably safe level (outside the ozone generation period and ozone decomposition period) it can pass through the deionisation apparatus for ion exchange en route to the fuel cell stack.

The ozone decomposition period may be a period of time during which ozone in the coolant decomposes to a level of ozone below a threshold level. This period may be fixed or may be determined by the controller.

The ozone decomposition period may be determined from the duration of the ozone generation period (that is, for the duration of operation of the ozone generator). For example, it may be assumed that under certain operating conditions, the level of ozone in the coolant will fall below a threshold level after a period of time (the ozone decomposition period) comprising a function of the ozone generation period. This may provide a simple way of determining what the ozone decomposition period may be for a particular ozone generation period.

The controller may be configured to control the coolant flow to the fuel cell by controlling the position of a valve to direct coolant either through the deionisation apparatus or through the bypass conduit.

The fuel cell system may comprise a coolant reservoir coupled to the fuel cell stack via the deionisation apparatus and bypass conduit. The coolant reservoir may be configured to receive coolant containing ozone. Thus advantageously the ozone generator may generate ozone and introduce this ozone into coolant stored in a coolant reservoir to ozonate the coolant. In some embodiments the ozone generator may be external to and coupled to the coolant reservoir. In some embodiments the ozone generator may be comprised within the coolant reservoir.

The controller may be configured to cause an ozone generator to periodically generate ozone in the coolant. The periodicity of ozone introduction may in some embodiments be determined according to one or more operating conditions.

The controller may be configured to cause the ozone generator to dynamically generate ozone in the coolant based on one or more of: a level of bacteria in the coolant; a coolant level; a coolant temperature; a coolant pressure; a fuel cell stack operating parameter; a stack voltage, a level of fuel in the fuel cell system; and a level of oxidant in the fuel cell system. Advantageously, ozone may be introduced into the coolant according to the fuel cell system operating conditions; that is, in response to the current fuel cell system operation. Thus if a particular parameter indicates that increased levels of ozone in the coolant may be beneficial to clean the coolant, the fuel cell system may respond to this indication by increasing the amount of ozone introduced into the coolant.

If the amount of ozone introduced into the coolant increases, the controller may correspondingly control the flow of coolant, such that the coolant flows through the bypass conduit for a greater proportion of time and through the deionisation apparatus for a lesser proportion of time. Conversely, if the amount of ozone introduced into the coolant decreases, the controller may correspondingly control the flow of coolant, such that the coolant flows through the bypass conduit for a lesser proportion of time and through the deionisation apparatus for a greater proportion of time.

The coolant may be water, for example purified water or deionised water.

The controller may be configured to control the coolant flow to the fuel cell stack by controlling the position of a non-return valve positioned between the deionisation apparatus and the fuel cell stack to prevent the flow of coolant from the fuel cell stack passing through the deionisation apparatus.

The controller is configured to control the coolant flow to the fuel cell by controlling the position of a non-return valve positioned between the bypass conduit and the fuel cell stack to prevent the flow of coolant from the fuel cell stack passing through the bypass conduit.

The fuel cell system may comprise an ultra violet light source configured to illuminate coolant before the coolant reaches the fuel cell stack.

The ozone generator may produce ozone via a corona discharge method, ultra violet light ozone production, a cold plasma method, or electrolytic ozone generation.

The ozone generator, deionisation apparatus, bypass conduit and controller of the first aspect may together form a coolant processing assembly/device for fuel cells.

According to another aspect, the invention provides a coolant assembly for a fuel cell system, the coolant assembly comprising:
   an ozone generator configured to introduce ozone into coolant;
   a deionisation apparatus configured to be coupled to a fuel cell stack;
   a bypass conduit arranged in parallel with the deionisation apparatus; and
   a controller configured to control flow of coolant to the fuel cell stack through either
      the deionisation apparatus or the bypass conduit based on the operating state of the ozone generator.

The coolant assembly may form part of a fuel cell system when in combination with a fuel cell stack. Accordingly, the optional features of the first aspect of the invention apply equally to this aspect of the invention.

According to another aspect, the invention provides a vehicle comprising a fuel cell system as described herein.

Embodiments of the present invention will now be described by way of example and with reference to the accompanying drawings in which.

Figure 1A:
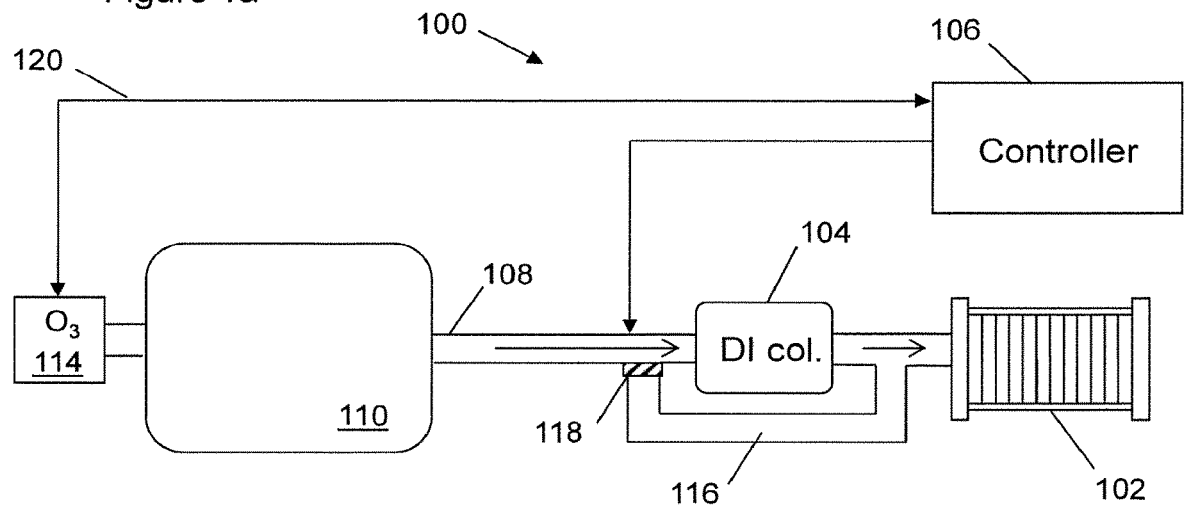
FIGS. 1a-1b show schematic views of an exemplary fuel cell system comprising a fuel cell stack, a coolant reservoir, an ozone generator, a deionisation apparatus, a bypass conduit, and a controller, with coolant flow directed through either the deionisation apparatus or the bypass conduit.

The various embodiments described below comprise a fuel cell stack 102, a coolant reservoir 110, an ozone generator 114, a deionisation apparatus 104, a bypass conduit 116, and a controller 106, with coolant flow directed through either the deionisation apparatus 104 or the bypass conduit 116. The controller 106 is configured to control flow of the coolant to the fuel cell stack 102 through either the deionisation apparatus 104 or the bypass conduit 116 based on the operating state of the ozone generator 114.

The following discussions use the term "coolant". The skilled person will appreciate that water, in particular purified or deionised water, may be used as a suitable coolant, but that the embodiments need not be restricted to the use of water as a suitable coolant.

The embodiments described herein provide for the cleaning of coolant in a fuel cell system using both ozone and a deionisation apparatus. Ozone may be used to disinfect coolant by reducing bacteria/microbes from the coolant. Deionisation may be used to remove unwanted ions from the coolant which may detrimentally affect the operation of the fuel cell stack. Thus the present invention advantageously provides improved fuel cell stack assemblies by allowing multiple coolant cleaning processes to take place, namely using ozone and a deionisation apparatus, while ensuring the chance of the ozone contacting the ion exchange resin in the deionisation apparatus is small or zero. Ozone may otherwise degrade the resin and reduce the efficacy of the deionisation apparatus in removing unwanted ions from the coolant.

Embodiments disclosed herein refer to a deionisation apparatus. This term is intended to encompass any deionisation apparatus which is configured to clean coolant by the exchange of ions which may be detrimental to a fuel cell stack for ions which are less harmful for a fuel cell stack. For example, any suitable deionisation apparatus comprising ion exchange resin or other ion exchange mechanism, such as a deionisation column, may be used.

Figure 1B:
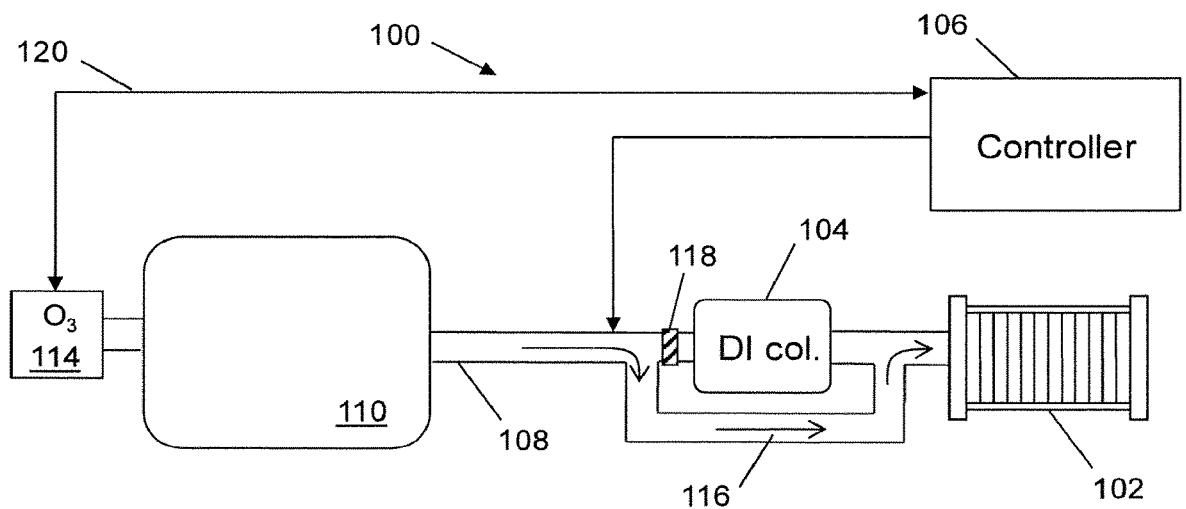

FIGS. 1a and 1b show a schematic side view of a fuel cell system 100 comprising a fuel cell stack 102 according to embodiments of the present invention. The system 100 comprises an ozone generator 114 configured to introduce ozone into a coolant in the fuel cell system 100. The ozone generator 114 in this example is located externally to, and coupled to, a coolant reservoir 110 which is in turn coupled to a deionisation apparatus 104 and a bypass conduit 116 via a coolant conduit 108. The bypass conduit 116 bypasses the deionisation apparatus 104 so that coolant may travel from the coolant reservoir 110 to the fuel cell stack 102 without passing through the deionisation apparatus 104. In other examples the ozone generator 114 may be located elsewhere in the fuel cell system, such as within a coolant reservoir 110.

The deionisation apparatus 104 and bypass conduit 116 are coupled in parallel to the fuel cell stack 102. The flow of coolant from the coolant reservoir 110 to the fuel cell stack 102 is via either the deionisation apparatus 104 or via the bypass conduit 116. The coolant flow is directed using a valve 118 located at a branch in the coolant conduit 108. The valve 118 is controlled by a controller 106. The valve 108 has a first position in which it directs the flow of coolant from the coolant conduit 108 to the deionisation apparatus 104, and a second position in which it directs the flow of coolant from the coolant conduit 108 to the bypass conduit 116.

FIG. 1a shows that the valve is in the first position such that coolant flows from the coolant reservoir 110 through the deionisation apparatus 104 to the fuel cell stack 102, and not through the bypass conduit 116. FIG. 1b shows that the valve is in the second position such that coolant flows from the coolant reservoir 110 through the bypass conduit 116 to the fuel cell stack 102, and not through the deionisation apparatus 104.

The controller 106 is configured to control the flow of coolant to the fuel cell stack 102 from the coolant reservoir 110. The flow path is determined based on the operating state of the ozone generator 114. The controller 106 controls the position of the valve 118 such that when there is ozone in the coolant (above a predetermined threshold) then the ozonated coolant travels through the bypass conduit 116 and not through the deionisation apparatus 104. When there is no ozone in the coolant (or a level of ozone below a predetermined threshold) then the coolant travels through the deionisation apparatus 104 and not through the bypass conduit 116. Thus embodiments described herein provide the benefits of coolant purification using both ozone and deionisation, while providing for directing coolant containing ozone away from deionisation apparatus 104, which may otherwise degrade the ion exchange resin in the deionisation apparatus 104.

Controller 106 is configured to control the coolant flow to the fuel cell stack 102 by controlling the position of the valve 118 to direct coolant either through the deionisation apparatus 104 or through the bypass conduit 116. The controller 106 in this example is configured to control the coolant flow to the fuel cell stack 102 such that the coolant passes through the bypass conduit 116 during an ozone generation period and an ozone decomposition period, and such that the coolant passes through the deionisation apparatus 104 outside the ozone generation period and ozone decomposition period. This is discussed in more detail with reference to FIG. 4.

The controller may be configured to control the ozone generator 114, and may send a signal via a connection 120 to the ozone generator 114 to switch the ozone generator 114 on and off. The switching may be performed periodically or dynamically depending on one or more operating parameters of the fuel cell system. For example, the ozone generator 114 may be switched on for 10 minutes, then switched off for 50 minutes, then switched on again for 10 minutes, and so on.

The ozone generation period is the period of time during which the ozone generator 114 generates ozone in the coolant (that is, when the ozone generator 114 is switched on). The ozone decomposition period is the period during which ozone in the coolant decomposes (by oxidation). The ozone decomposition period may have a duration such that, at the end of the ozone decomposition period, an amount of ozone below an acceptable threshold level remains. The ozone generator 114 is switched off during the ozone decomposition period, but ozone will still be present in the coolant for a finite period of time after the ozone generator 114 is switched off. The level of ozone will reduce with time through decomposition of the ozone molecules.

The ozone decomposition period may be a period of time which is fixed based on the ozone generation period. For example, if the ozone generator 114 is switched on for ten minutes every hour, it may be determined that the ozone decomposition time is 15 minutes, and that after this 15 minute period, the level of ozone remaining in the coolant is sufficiently low that the coolant may pass through the deionisation apparatus without significant degradation of the ion exchange resin due to the presence of ozone. In this example, the valve 118 would be in the second position as shown in FIG. 1b such that the coolant is directed through the bypass conduit 116 for 25 minutes (a 10 minute ozone generation period followed by a 15 minute ozone decomposition period). The valve 118 would then move position to the first position shown in FIG. 1a such that coolant is directed through the deionisation apparatus 104 for 35 minutes. After this one hour cycle, the valve 118 would move back to the first position and the hourly cycle would repeat. Such a fixed cycle of directing the coolant flow 114 may be considered a static control of the coolant flow since it does not depend on any fuel cell system operating parameters.

Figure 2:
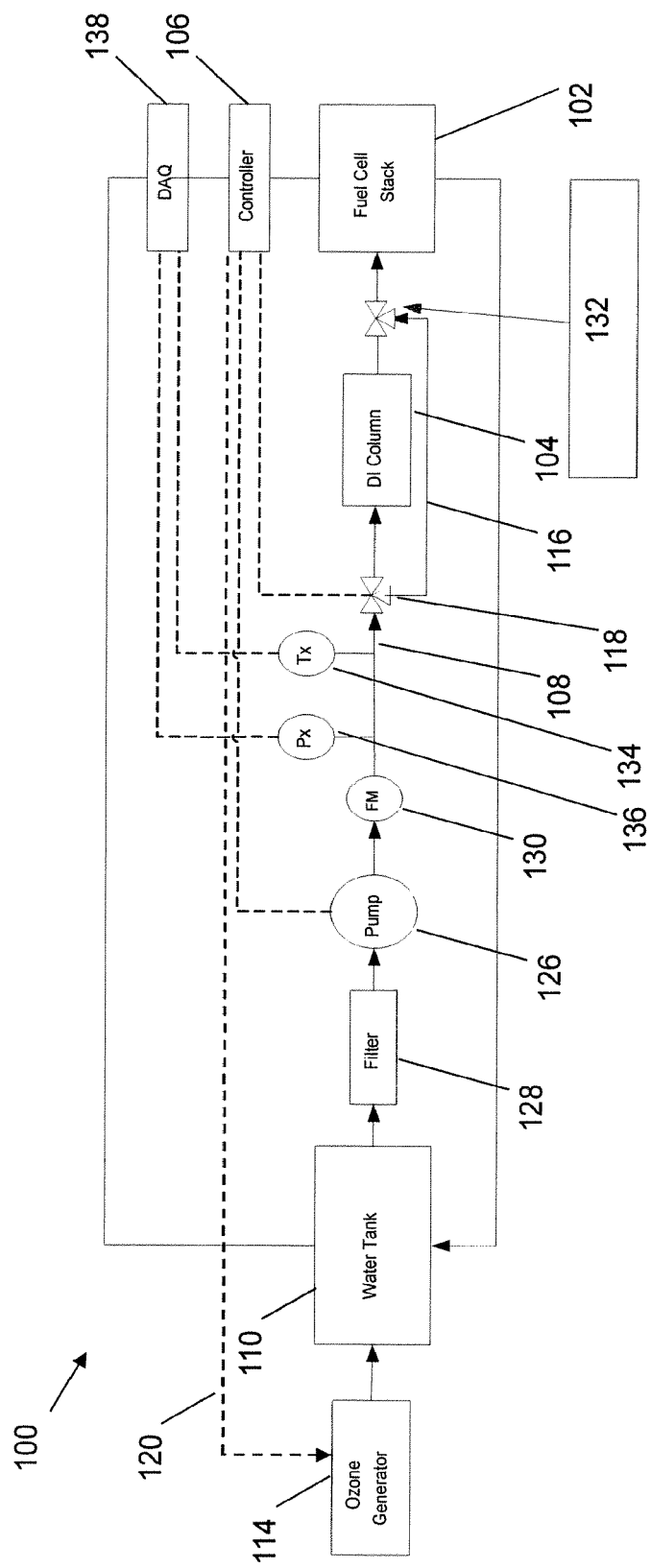
FIG. 2 shows a schematic view of an exemplary fuel cell system comprising a filter, a pump, a non-return valve, a flowmeter, and pressure and temperature sensors.

In other examples the ozone decomposition period may be determined based on one or more other factors, such as coolant temperature, as discussed in relation to FIG. 2. The ozone generation period and/or ozone decomposition period, and therefore the coolant flow path, may be adjusted by the controller 106 dependent on the fuel cell system operation. This may be considered dynamic control of the coolant flow because the coolant flow path through the deionisation apparatus 104 or bypass conduit 116 is determined on-the-fly depending on fuel cell system operating parameters received by the controller 106.

FIG. 2 shows a schematic side view of an example embodiment of a fuel cell system 100 which builds upon that shown in FIGS. 1a and 1b. The same reference numerals have been used for like parts. The system 100 comprises an ozone generator 114 coupled to a coolant reservoir/water tank 110. The water tank 110 is coupled to the deionisation apparatus 104 and the bypass conduit 116 via a filter 128, a pump 126, and a flowmeter 130 in the coolant conduit 108.

The filter 128 may be used to filter the coolant before it reaches the fuel cell stack 102, for example by removing organic contaminants such as dead bacteria. filter 128 is positioned upstream of the deionisation apparatus 104 and the fuel cell stack 102, for example to filter out bacterial debris and prevent it from entering the deionisation apparatus 104. The pump 126 may be used to pump coolant from the coolant reservoir 110 to the fuel cell stack 102 and in this example is controlled by the controller 106. The flowmeter 130 provides feedback to the controller and indicates the flow of coolant in the coolant path 108.

The coolant flow through either the deionisation apparatus 104 or the bypass conduit 116 is directed using a valve 118 controlled by the controller 106.

In this example the controller 106 is coupled to a data acquisition card (DAQ) 138 for data acquisition from sensors in the fuel cell system 100. In this example the DAQ 138 is coupled to a pressure sensor 136 and a temperature sensor 134 for receiving pressure and temperature readings from the coolant path 108 between the coolant reservoir 110 and the valve 118. The temperature sensor 134 may be used to determine a coolant temperature, and the controller 106 may use the coolant temperature to dynamically introduce ozone into the coolant. For example, ozone decomposes more quickly as temperature increases, so if the temperature sensor indicates an increase in temperature, the controller 106 may cause the ozone generator 114 to introduce more ozone into the coolant to counteract the effect of the ozone decomposing more quickly. The pressure sensor 136 may be used to determine a coolant pressure and the controller may dynamically introduce ozone into the coolant based on the coolant pressure. For example, a lower coolant pressure may indicate a lower flow rate, so the controller 106 may control the ozone generator 114 to produce less ozone for introduction into the coolant.

In other examples the controller 106 (or DAQ 138) may be coupled to a bacteria level meter for determining a level of bacteria in the coolant, and/or a coolant level meter for determining the level of coolant in the fuel cell system 100. For example, the controller 106 may cause the ozone generator to generate more ozone in response to increased bacteria levels for introduction of the ozone into the coolant.

The controller 106 in this example is also coupled to the fuel cell stack 102, for example to receive a fuel cell stack operating parameter such as stack voltage, hydrogen level, or oxygen level. The controller 106 may use the stack voltage to dynamically generate ozone in the coolant. For example, a lower stack voltage may indicate that more ozone is required to improve the coolant purity and thereby cause an increase in the stack voltage.

Also in this example a second valve 132 is present in the coolant path 108 between the deionisation apparatus 104, the bypass conduit 116, and the fuel cell stack 102. This second valve 132 may be coupled to the controller 106 and/or the valve 118 to receive signals indicating the required position of the second valve 132. The second valve 132 may be a three-way valve, and may be considered a non-return valve 132 as it may be used to prevent back flow from the fuel cell stack 102 to the deionisation apparatus 104 and the bypass conduit 116. For example, the second valve 132 may be positioned to prevent back-flow from the fuel cell stack to the deionisation apparatus and/or the bypass conduit.

In this example the valve 118 and the valve 132 are activated in combination by the controller 106. The controller 106 is configured to control the coolant flow to the fuel cell stack 102 by controlling the position of the non-return valve 132 positioned between the deionisation apparatus 104 and the fuel cell stack 102 to prevent the back flow of coolant from the fuel cell stack 102 into the deionisation apparatus 104. The controller 106 is also configured to control the coolant flow to the fuel cell stack 102 by controlling the position of the non-return valve 132 positioned between the bypass conduit 116 and the fuel cell stack 102 to prevent the back flow of coolant from the fuel cell stack 102 through the bypass conduit 116. Thus, the same non-return valve 132 is used to prevent back flow into the deionisation column when the valve 118 directs flow through the bypass conduit 118, and to prevent back flow into the bypass conduit 116 when the valve 118 directed flow through the deionisation apparatus 104. It will be appreciated that the non-return valve 132 could be replaced by a one way valve in the bypass conduit 116 and downstream of the deionisation apparatus 104 prior to where the bypass conduit 116 and output from the deionisation column 104 meet.

Figure 3:
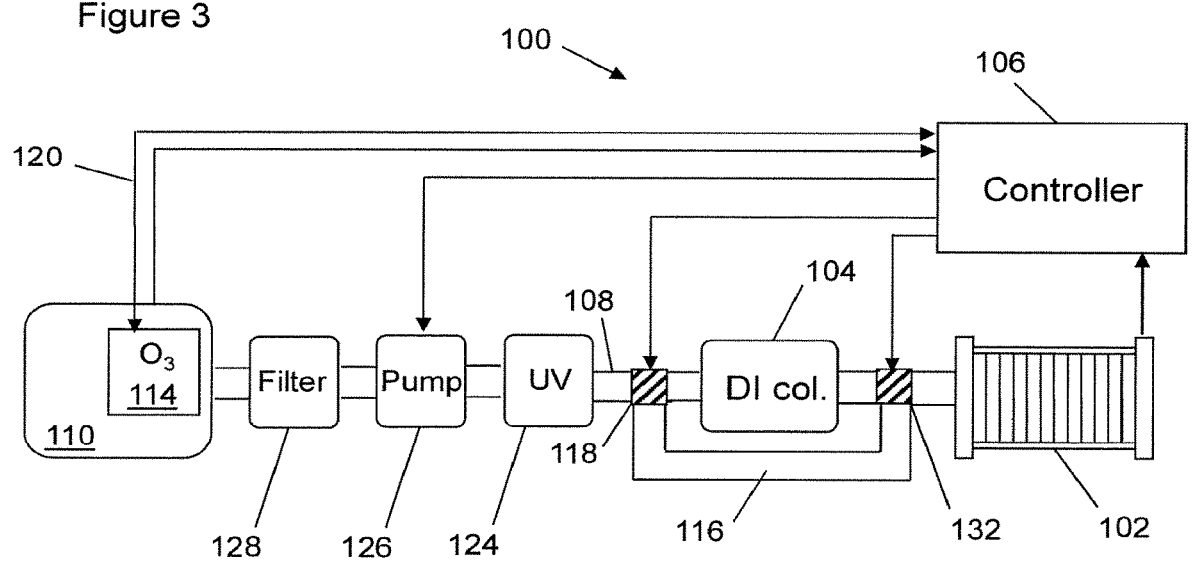
FIG. 3 shows a schematic view of an exemplary fuel cell system comprising a UV light source.

FIG. 3 shows a schematic side view of an example embodiment of a fuel cell system 100 which builds upon the systems described above. The same reference numerals have been used for like parts. The fuel cell system 100 comprises an ozone generator 114 positioned within a coolant reservoir 110 (in other examples such as those in FIGS. 1a-1b and 2, the ozone generator 114 may be external to the coolant reservoir 110). The coolant reservoir 110 is coupled to the deionisation apparatus 104 and the bypass conduit 116 via a filter 128, pump 126, and in this example a UV light source 124 in the coolant conduit 108. The UV light source 124 may be a series of UV light emitting diodes (LEDs), for example.

The UV light source 132 is configured to illuminate coolant in the coolant path 108 before the coolant reaches the fuel cell stack 102. UV light can be used to disinfect coolant (water) because it causes bacteria and microbes in the coolant to break down.

Figure 4:
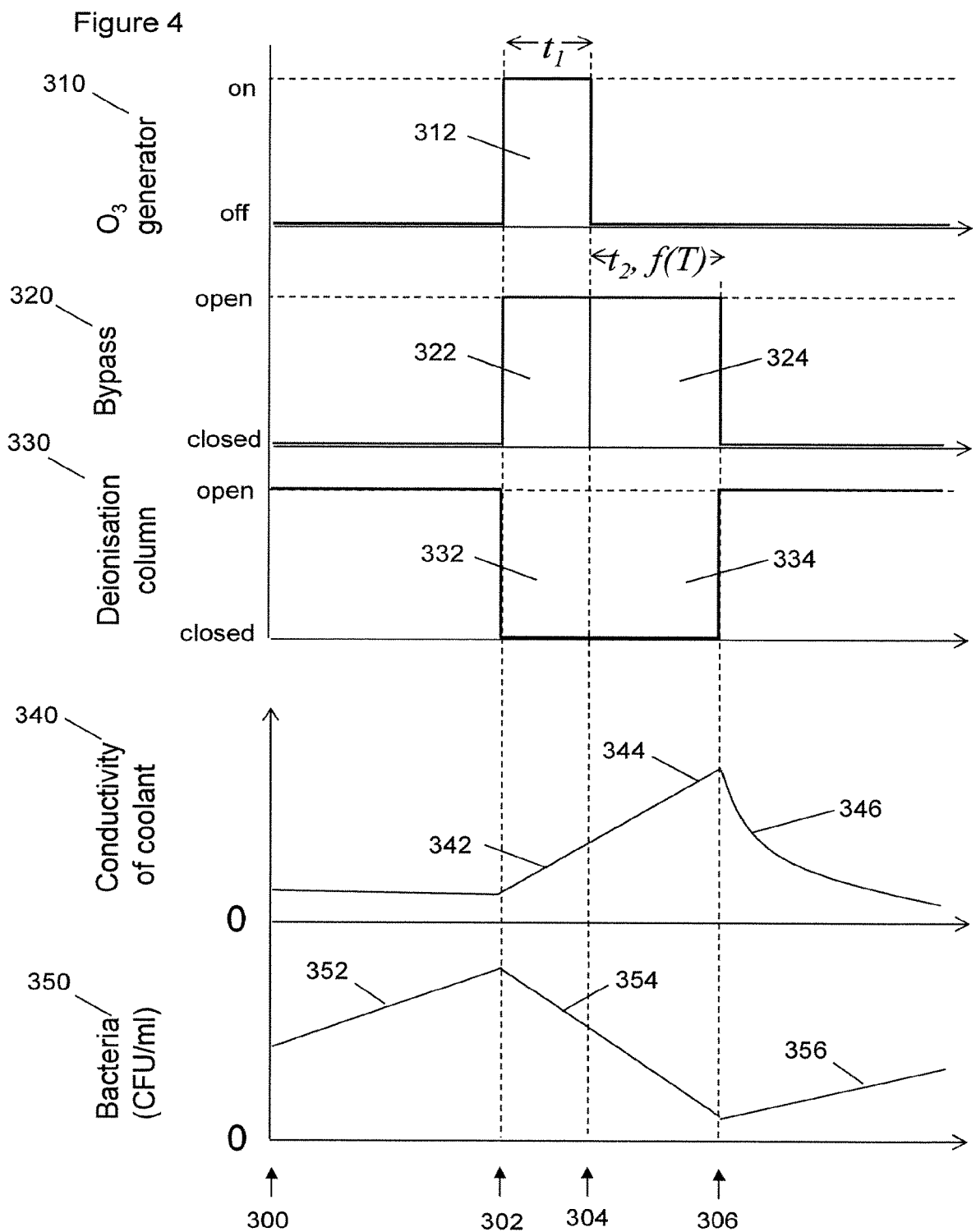
FIG. 4 shows an exemplary schematic plot against time of the operating state of an ozone generator, the operating state of a bypass conduit, the operating state of a deionisation apparatus, the conductivity of coolant, and bacterial levels in the coolant.

FIG. 4 illustrates a schematic plot against time of different factors relating to fuel cell systems as described herein. The plot shows: the operating state of an ozone generator 310, being either on or off; the operating state of the bypass conduit 320, being either open (with coolant flowing through it) or closed (no coolant flowing through it) by virtue of the position of the valve 118; the operating state of the deionisation apparatus 330, being either open (with coolant flowing through it) or closed (no coolant flowing through it) by virtue of the position of the valve 118; the conductivity of the coolant 340; and bacterial levels in the coolant 350 plotted as the logarithm of the number of colony forming units (CFU) in the coolant.

Initially 300 no ozone is being generated. The ozone generator is switched off. The valve 118 is in the first position and the coolant is able to flow through the open deionisation apparatus and is not able to flow through the closed bypass conduit. The coolant conductivity is decreasing because the coolant is passing through the deionisation apparatus which acts to remove inorganic contaminant ions in the coolant and thereby reduce the conductivity of the coolant. The bacterial levels are relatively high and increasing 352 because the ozone levels are relatively low (low enough for coolant to pass through the deionisation apparatus).

At a switch-on time 302, the ozone generator is switched on for a period $t_1$. During this ozone generation period 312, ozone is being generated. The valve 118 controlling the coolant flow through either the deionisation apparatus or the bypass conduit switches to the second position. The bypass conduit is thus opened 322 and coolant is now able to flow through the bypass conduit. The deionisation apparatus is correspondingly closed 332, and coolant is not allowed to flow through the deionisation apparatus. With deionisation apparatus bypassed, the coolant conductivity increases 342 because of the increasing levels of inorganic ions in the coolant, which may be due to chemical reactions between the coolant and the wetted surfaces in contact with the coolant. The bacterial levels in the coolant decrease 354 as the generated ozone introduced into the coolant kills the bacteria.

At a switch-off time 304 the ozone generator is switched off for a period $t_2$, which is a function of temperature, f(T). The rate of ozone decomposition increases as temperature increases. Thus, at higher temperatures, the ozone decomposition period is shorter and at lower temperatures, the ozone decomposition period is longer. During this ozone decomposition period, ozone is not being generated but is present and gradually decomposing in the coolant. The controller maintains the valve 118 in the second position and thus the bypass conduit remains open 324. Thus coolant is still able to flow through the bypass conduit. The deionisation apparatus remains closed 334, and coolant is still not able to flow through the closed deionisation due to the residual ozone in the coolant. The coolant conductivity continues to increase 344 because the coolant is bypassing the deionisation apparatus, therefore inorganic contaminant ions are being formed in the coolant without being removed by the deionisation apparatus. The bacterial levels continue to decrease 354 due to the remaining ozone in the coolant.

After a predetermined ozone decomposition period 306 the level of ozone remaining in the coolant is low enough that passing the coolant through the deionisation apparatus will not significantly degrade the ion exchange resin. At this point the controller activates the valve 118 to move it to the first position and the bypass is closed to flow. The deionisation apparatus is re-opened for coolant to flow through and undergo ion exchange. The conductivity of the coolant decreases 346 because of the ion exchange process taking place as the coolant passes through the deionisation apparatus. The operation of the deionisation apparatus will now be described briefly. As cations and anions pass through the deionisation apparatus they may be captured following the ion exchange principle. The deionisation apparatus may comprise a cation resin configured to capture cations and an anion resin configured to capture anions. For example, a $Ca^{2+}$ cation can react with a $OH^-$ molecule to form $Ca(OH)^2$. The same principle applies with anions and $H^+$ molecules (for example $Cl^-$ and $H^+$ can combine to form HCl). In order to keep a chemical balance within the deionisation apparatus cartridge, every time a cation is captured by the cation resin, the resin will release a $H^+$ ion into the coolant (similarly the anion resin releases $OH^-$ ions in the water after anion capture). These $H^+$ and $OH^-$ ions can bind together to form a water molecule ($H_2O$). The number of bacteria may begin to increase 356. The cycle can repeat such that the ion levels and bacteria levels are controlled.

In this example the controller determines the ozone decomposition period based on the temperature of the coolant. In other examples the controller may determine the ozone decomposition period based on other factors, such as stack voltage, coolant level, bacterial level, coolant pressure, and gas levels in the fuel cell, for example. In other examples the ozone generation time $t_1$ and the ozone decomposition time $t_2$ may be fixed regardless of any other parameters. The period $t_1$ may be determined from factors such as a level of bacteria in the coolant; a coolant level; a coolant temperature; a coolant pressure; a fuel cell stack operating parameter; a stack voltage; a level of hydrogen in the fuel cell system; or a level of oxygen in the fuel cell system.

A combination of an ozone generator, a deionisation apparatus, a bypass conduit and a controller as disclosed herein may be considered to be a coolant assembly for a fuel cell system. Such a coolant assembly, or a fuel cell system comprising a coolant assembly and a fuel cell stack, may be used to power a vehicle, for example.

Although the invention is described in terms of an ozone generator and a deionisation apparatus, which is bypassed by way of a bypass conduit, other components that cannot function at the same time due to an incompatibility can make use of the bypass conduit and controller described herein. Thus, the ozone generator may be considered as a first conditioning device and the deionisation apparatus as a second conditioning device, in the description above.

It will be appreciated that the above described embodiments may be combined in various ways within the scope of the claims. For example, a fuel cell system may comprise a filter for removing bacterial debris from the coolant between a UV light source and a fuel cell stack. Other embodiments are intentionally within the scope of the accompanying claims.

What is claimed:

1. A method of operating a fuel cell system, the method comprising:
    introducing ozone with an ozone generator into a coolant in the fuel cell system;
    controlling flow of the coolant to a fuel cell stack in the fuel cell system with a controller,
    determining a level of ozone in the flow of the coolant; and
    comparing the level of ozone with a predetermined threshold level of ozone in the coolant;
    wherein the controlling of the flow of the coolant comprises directing the flow of the coolant through either a deionisation apparatus or a bypass conduit based on an operating state of the ozone generator,
    wherein the bypass conduit is arranged in parallel with the deionization apparatus and the deionization apparatus is coupled to the fuel cell stack;
    wherein the flow of the coolant is directed through the bypass conduit when the level of ozone in the coolant is above the predetermined threshold level of ozone in the coolant; and,
    wherein the flow of the coolant is directed through the deionisation apparatus when the level of ozone in the coolant is below a predetermined threshold level of ozone in the coolant.

2. The method of claim 1, wherein the method further comprises controlling the coolant flow to the fuel cell stack by controlling the position of a valve to direct coolant either through the deionisation apparatus or through the bypass conduit.

3. The method of claim 1, wherein the method further comprises:
    directing coolant containing ozone to a coolant reservoir;
    wherein the coolant reservoir is coupled to the fuel cell stack via the deionization apparatus and the bypass conduit.

4. The method of claim 1, wherein the method further comprises using the controller to periodically introduce ozone in the coolant with the ozone generator.

5. The method of claim 4, wherein the method further comprises using the controller to cause the ozone generator to dynamically introduce ozone in the coolant based on one or more of:
    a level of bacteria in the coolant;
    a coolant level;
    a coolant temperature;
    a coolant pressure;
    a fuel cell stack operating parameter;
    a stack voltage;

a level of fuel in the fuel cell system; and, a level of oxidant in the fuel cell system.

6. The method of claim 1, wherein the coolant is water.

7. The method of claim 1, wherein the method further comprises controlling the position of a non-return valve positioned between the deionisation apparatus and the fuel cell stack to prevent a flow of the coolant from the fuel cell stack from passing through the deionization apparatus.

8. The method of claim 1, wherein the method further comprises controlling the position of a non-return valve positioned between the bypass conduit and the fuel cell stack to prevent a flow of the coolant from the fuel cell stack from passing through the bypass conduit.

9. The method of claim 1, wherein the method further comprises illuminating the flow of the coolant with an ultra-violet light source before the coolant reaches the fuel cell stack.

10. The method of claim 1, wherein the method further comprises delivering power generated by the fuel cell system to a vehicle.

11. A method of operating a fuel cell system, the method comprising:
    introducing ozone with an ozone generator into a coolant in the fuel cell system;
    controlling flow of the coolant to a fuel cell stack in the fuel cell system with a controller,
    wherein the controlling of the flow of the coolant comprises directing the flow of the coolant through either a deionisation apparatus or a bypass conduit based on an operating state of the ozone generator,
    wherein the bypass conduit is arranged in parallel with the deionization apparatus and the deionization apparatus is coupled to the fuel cell stack;
    wherein the flow of the coolant is directed through the bypass conduit during an ozone generation period and an ozone decomposition period; and
    wherein the ozone generation period comprises a period during which the ozone generator introduces ozone into the coolant.

12. The method of claim 11, wherein the method further comprises controlling the coolant flow to the fuel cell stack by controlling the position of a valve to direct coolant either through the deionisation apparatus or through the bypass conduit.

13. The method of claim 11, wherein the method further comprises:
    directing coolant containing ozone to a coolant reservoir;
    wherein the coolant reservoir is coupled to the fuel cell stack via the deionization apparatus and the bypass conduit.

14. The method of claim 11, wherein the method further comprises using the controller to periodically introduce ozone in the coolant with the ozone generator.

15. The method of claim 11, wherein the method further comprises using the controller to cause the ozone generator to dynamically introduce ozone in the coolant based on one or more of:
    a level of bacteria in the coolant;
    a coolant level;
    a coolant temperature;
    a coolant pressure;
    a fuel cell stack operating parameter;
    a stack voltage;
    a level of fuel in the fuel cell system; and,
    a level of oxidant in the fuel cell system.

16. The method of claim 11, wherein the coolant is water.

17. The method of claim 11, wherein the flow of the coolant is directed through the deionisation apparatus outside the ozone generation period and the ozone decomposition period.

18. The method of claim 11, wherein the method further comprises:
    determining a level of ozone in the flow of the coolant; and
    comparing the level of ozone with a predetermined threshold level of ozone in the coolant;
    wherein the ozone decomposition period is a period of time during which the level of ozone decomposes from a level of ozone higher that the predetermined threshold level of ozone in the coolant to a level of ozone below the predetermined threshold level of ozone in the coolant.

19. The method of claim 11, wherein the method further comprises:
    determining the ozone decomposition period based on the duration of the ozone generation period.

20. The method of claim 11, wherein the method further comprises delivering power generated by the fuel cell system to a vehicle.

* * * * *